ARRANGEMENT FOR INTERCONNECTING LOGICAL OPERATIONAL UNITS FOR PNEUMATIC CONTROLS

Filed March 14, 1967

2 Sheets-Sheet 1

INVENTORS
ROLF KLAUS
HARALD TITTEL
RENATE WAGNER

June 23, 1970 R. KLAUS ET AL 3,516,436

ARRANGEMENT FOR INTERCONNECTING LOGICAL OPERATIONAL UNITS FOR PNEUMATIC CONTROLS

Filed March 14, 1967 2 Sheets-Sheet 2

INVENTORS
ROLF KLAUS
HARALD TITTEL
RENATE WAGNER

United States Patent Office 3,516,436

Patented June 23, 1970

3,516,436
ARRANGEMENT FOR INTERCONNECTING LOGICAL OPERATIONAL UNITS FOR PNEUMATIC CONTROLS

Rolf Klaus, Harald Tittel, and Renate Wagner, Karl-Marx-Stadt, Germany, assignors to Institut fur Werkzeugmaschinen, Karl-Marx-Stadt, Germany Filed Mar. 14, 1967, Ser. No. 622,982
Int. Cl. F15c 3/00
U.S. Cl. 137—561 7 Claims

ABSTRACT OF THE DISCLOSURE

In an assembly of a plurality of logic elements the operational logic elements are arranged on base plates. Several of such base plates can be arranged in a vertical column and secured by a vertical guide rail. Several of such vertically arranged operational units are interconnected by means of a distributor carrier plate arranged under each column. Such distributor carrier plate is provided with channels on several levels and in a rectangular coordinate system to provide a large number of connections between the columns of operational elements. Between adjoining distributor carrier plates an intermediate spacing member is provided which is similarly channelled as the carrier plate. The distributor carrier plates and the intermediate members are supported in a guide rail. Outlets for further connections open on the side of the carrier plate opposite to the side carrying the column of operation units.

BACKGROUND OF THE INVENTION

Field of the invention

The present invention relates to an arrangement for interlinking structural units or elements for pneumatic controls by means of distributor plates to which the structural elements or units are joined, the latter comprising interconnected base plates carrying operational elements for performing known logical switching operations.

Description of the prior art

It is already known to interconnect logical switching elements for pneumatic controls by means of standard connecting elements. For this purpose, prior art uses so-called base plates which consist of an oblong body with rectangular profile, the surface of which is predrilled on all sides in a rectangular coordinate system and on several levels, so that a great variety of connecting channels may be established according to the purpose of application. In its assembled form basic elements are fastened on two oppositely arranged surfaces of the base plate. These basic elements contain the logical switching elements, whereas the two other side faces serve for interconnecting one base plate with further base plates. The borings in the frontal surfaces serve only for completing the connections, but the openings will then be closed. In this way, the operational elements are interconnected by means of the base plates into structural units. A thin rubber seal is arranged in each case between two adjacent elements. This rubber seal is provided on both sides with connecting nipples which fit into the borings of the adjoining elements, and which seal is adapted either to connect or to separate the channels of adjoining elements, the latter being the case if the partition membrane with which the space between the connecting nipples is filled, remains unremoved. The operational elements are thus interconnected in longitudinal direction by means of the channels which extend from one base plate to the other, and linked-up in the transverse direction by channels which extend at right angles to the former ones. The entire control system is thus divided into several partial circuits, each one comprising one construction or structural unit, the capacity of each of which is determined by the number of channels contained in the associated base plate.

SUMMARY OF THE INVENTION

However, in order to provide a practical embodiment of a control system, it is necessary to link-up several units with each other. For this purpose, a so-called distributor plate is attached to the last or to the last two base plates of a unit to extend the channels of the side-by-side connected base plates toward the outside and communicate them with connecting hoses which are arranged on two opposite sides of the distributor plate. The interlinking of one unit with the other is thus attained in this prior art arrangement in form of hose connections. The multitude of individual elements is then retained in a frame into which one or several rows of construction units, each row comprising one or several units, are clamped, each distributor plate being arranged on both ends of each unit or between pairs of such units.

Since the hose connections for the interlinking on both sides extend from the distributor plates in the direction of the operational elements which are carried by the respective base plates, the units are more or less covered or concealed by a large number of such hose connections. If now some disorder or interference occurs in one of the units which requires checking and repair, or if some change is necessary for another reason, such as either an operational element must be removed from one of the base plates or an entire unit must be removed from the assembly, an operation which is not only complicated, but requires time and effort arises.

An object of the present invention is to provide an arrangement for interconnecting individual units into a pneumatic control system in which the accessibility to each operational element and to each one of the units is attained in such a way, that the same can be removed or detached from the entire assembly of the control system in a fast and convenient manner.

In accordance with the present invention each of the construction units is for the interlinking purpose at only one of its ends provided with a connecting element which at only one of its faces and preferably at the face thereof opposite to the operational units is provided with elements for the connecting hoses.

In accordance with the invention each logical unit is arranged on a distributor carrier plate, with several of such distributor carrier plates being joined together with sides for connection to the units facing one common direction, and being retained in a frame and connected between each other by means of channels for carrying pressurized fluid. The distributor carrier plates are provided with hose connections on the side thereof which is opposite to the side intended for the connection of such plates to the logical units. Another embodiment of the invention provides that channels are formed in each distributor carrier plate in several planes which cross each other at right angles.

In all embodiments, the distributor carrier plates are aligned or joined together with their frontal sides, with their longitudinal sides being retained by rail members which form a frame, and an intermediate member being provided between two adjoining distributor carrier plates for the attachment or fastening of the logical unit to the respective distributor carrier plates.

BRIEF DESCRIPTION OF THE DRAWING

The invention will become more readily understood from a description of preferreed embodiments thereof, shown in the accompanying drawings, in which.

DESCRIPTION OF THE PREFERRED EMBODIMENTS

Figures 1, 2, 3, 4:
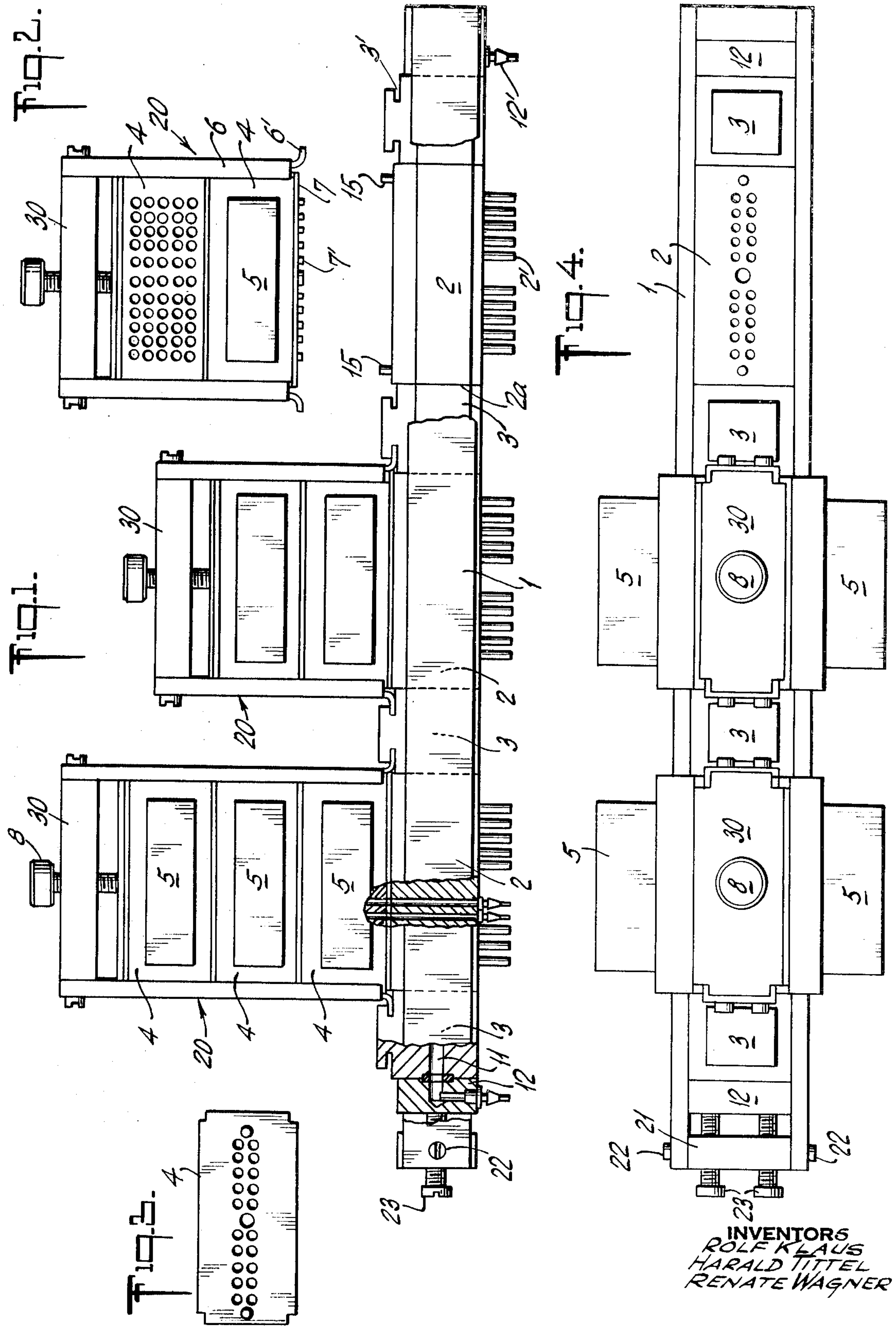
FIG. 1 is an elevational view of an embodiment of a control assembly partly in section, one unit being removed and shown separately in FIG. 2.
FIG. 2 shows the removed unit of FIG. 1, with the operational element removed from one of the base plates.
FIG. 3 shows the bottom view of the base plate of FIG. 2 viewed in the direction of the arrow.
FIG. 4 is a plane view of FIG. 1.

With reference to FIGS. 1–4, it is seen that several distributor carrier plates 2 are joined together with their frontal surfaces 2*a* in a frame which is formed by a pair of rail members 1 which are joined by spacing members 21 at their ends held in place by screws 22. Hold down means such as a pair of hold down screws 23 are threaded into spacing member 21 as shown at one side of the assembly and rest against end blocks 12 to hold the entire assembly together in a lengthwise direction. The rail members may be predrilled to allow holding screws to be inserted into threaded bores in the distributor carrier plates. However, in the preferred embodiments illustrated, the distributor carrier plates are supported by laterally and inwardly extending flanges of the rail member pair 1, in which flanges the distributor carrier plate is able to slide. An intermediate member 3 is arranged between each pair of distributor carrier plates 2 and also at each end of the row which is formed by these distributor plates. A unit 20 is arranged on each distributor carrier plate 2. In the embodiment illustrated in FIGS. 1 and 4, for illustrative purposes three units are provided to correspond with the number of the distributor carrier plates 2 held between said rail members 1. Each of these construction units comprises several known base plates 4, with their logical operational elements 5 thereon. The base plates 4 are interconnected and stacked on top of one another. These base plates 4 within the respective units 20 are retained in stacked position with the help of upstanding rails 6, which rails are joined by a cross member 30 to form a frame, and of which the ends 6′, nearest to the distributor carrier plates 2, are bent off toward the outside. The rail ends 6′ are inserted by sliding from the side into fastening means such as recesses 3′ formed in intermediate members 3.

The unit is slid over the respective distributor carrier plate until the surface of base plate 4, which is shown in FIG. 3 as lying uncovered at the open end of the assembled unit 20, comes to rest on the upper surface of the associated distributor carrier plate 2, so that the borings provided in both surfaces will also come to rest upon each other to establish a fluid-tight communication between unit 20 and the associated distributor carrier plate 2. In order to improve the fluid-tight connection of the channels between unit 20 and the carrier plate, a thin rubber seal 7 is provided on both sides of which are provided connecting nipples 7′ which fit into the respective borings of the base plate 4 and of the distributor carrier plate 2.

In order to secure a safe and proper joining of the base plates 4 against each other, an adjustable holddown screw 8 is provided in cross member 30 of the frame. Each distributor carrier plate is provided with at least a pair of pin-like projections 15 which enter into corresponding recesses (not shown) formed in the base plate 4 in order to provide an improved centering of the base plates 4 when assembled in a vertical column secured by hold-down screw 8. The channels which extend from the base plates 4 of each unit into the associated distributor carrier plates 4 of each unit into the associated carrier plates 2 open into outlets 2′ extending from the distributor plates 2, and adapted to make hose connections to them. It is noted that the outlets 2′ may be just openings in the bottom side of the distributor carrier plates 2 into which then the connecting hoses are inserted. Interlinking between two or any number of units in accordance with the logical operation which the control assembly is to perform, is attained by way of hoses attached to outlets 2′.

Figure 5:
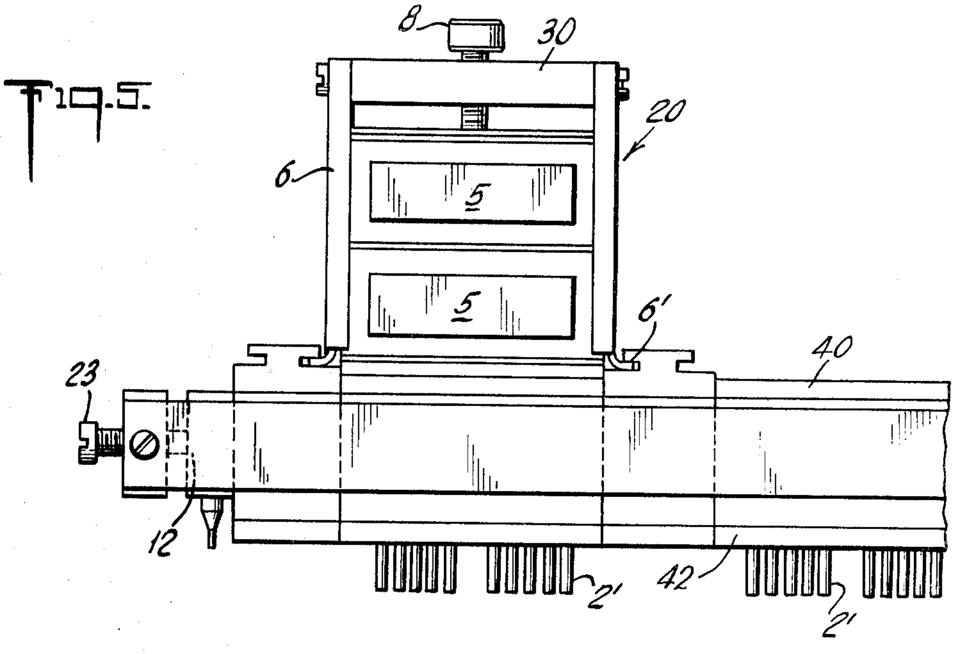
FIG. 5 shows another embodiment of the invention in side view with a part broken away.
Figure 6:
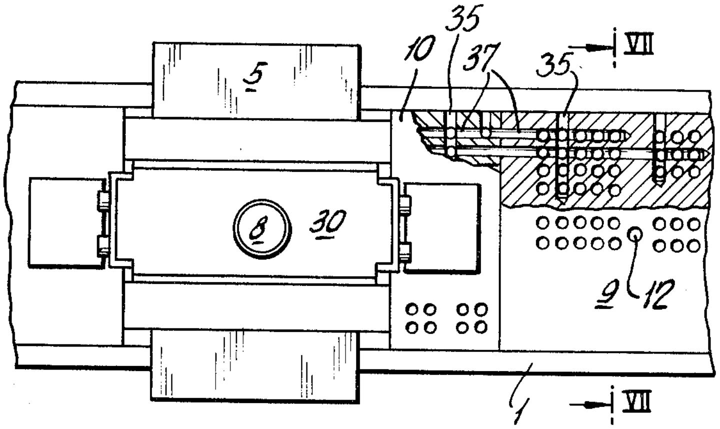
FIG. 6 is a plane view of FIG. 5, partly in section.
Figure 7:
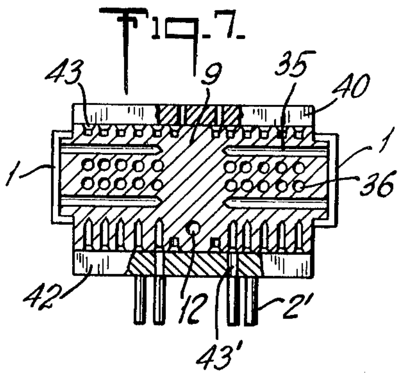
FIG. 7 is a sectional view along the line VII—VII of FIG. 6.

In the embodiment shown in FIGS. 5 to 7, distributor carrier plates 9 are provided which are formed with channels not only extending into one direction i.e., not only into the direction leading toward the afore-mentioned hose connection outlets 2′, but which are provided with borings 35, 36 similar to base plates 4 in several planes and in a rectangular coordinate system, leaving a partition between the pre-drilled channels, so that channels in different levels could be connected by later removing such partitions according to the particular requirement of interconnecting a unit 20 with one or several other units. The passages designated by 35 extending from left to right in the carrier plate 9 as seen in FIG. 7, are part of the rectangular coordinate system mentioned above. If, for instance, connection is desired between any one of the channels 43 and 36, the predrilled channel 43 is extended to the channel 35 which is running under the row in which the desired hole 36 is located, then such channel 35 is in turn extended to the location of the desired hole 36 which is then drilled further to intersect the extended channel 35. Inasmuch as drilling of channel 35 is performed from the outside, which operation leaves an opening, the rails also function to seal such opening after assembly as seen in FIGS. 6 and 7.

All passages can be predrilled to a certain degree and then drilled further by removing the remaining material up to the desired intersection according to the particular switching or other requirement.

Above and below carrier plates 9, as seen in FIG. 7, connecting plates 40 and 42 are disposed which perform a sealing function by covering the pre-drilled matrix-like passages in carrier plate 9. Connecting plates 40 and 42 are drilled only to accommodate channels in carrier plate 9 which are to be used in a particular connection such as identified by 43′ in FIG. 7 for illustrative purposes, to supply fluid through connectors 2′. These distributor carrier plates 9 are also arranged to be slid in the frame formed by rail members 1, with an intermediate member 10 being provided on both sides. As indicated by the illustration, also this embodiment provides that one unit 20 is arranged on each of these distributor carrier plates 9. For linking up units 20, the channels 35, 36 in these distributor carrier plates 9 communicate with corresponding channels 37 in the intermediate members 10. This leads to a further reduction of required hose connections, the latter being replaced to the largest possible extent by the channels in the distributor plates 9. Hence, only those channels will go through hose connections which cannot be accommodated by channel connections through the distributor carrier plates 9 and intermediate members 10 on account of the great number of connections which have to be established, or which require connection to units arranged on other frames of a complex control arrangement. The intermediate member 10 is also predrilled in several planes and in a rectangular coordinate system similarly to carrier plate 9 as seen in FIG. 7 in order to provide the possibility of shifting the pneumatic signal also within this member.

In both embodiments, an auxiliary air channel 11 is formed from one distributor carrier plate 2, respectively 9, to the other by way of the intermediate members 3, respectively 10, which is then taken over or carried on by the base plates 4 and guided to the desired operational elements 5. This is for the conveyance of air with constant pressure which is admitted as bias pressure to the logical elements. This channel 11 opens into hose connection outlet 12' with which end blocks 12 are fitted. End blocks 12 are arranged only on the two ends of the row formed by the distributor carrier plates 2, respectively 9, and the intermediate members 3, respectively 10, within rails 1. In this way, it is not necessary to provide the distributor carrier plates 2, respectively 9, of each unit 20 with such an auxiliary-air outlet.

This solution according to the invention eliminates the necessity to extend hoses past or along the units. According to the invention, hoses are now extended only within the range of the distributor carrier plates 2, respectively 9, and preferably along or past those surfaces of the last-mentioned plates which are opposite to the units 20. In this way, an unobstructed access to each of the units and its operational elements is attained. Therefore, the units 20 may be readily removed from their operating position on the frame, and also the operational elements 5 can be removed without difficulty from their associated base plates 4 without necessity of disturbing the hose connection.

What is claimed is:

1. In a pneumatic control assembly, a plurality of base elements arranged in at least one vertical column including at least one base element, adjoining base elements being in fluid-transmitting communication with each other through interconnected channels formed in each of said base elements, a plurality of operational elements for performing logical functions carried by said base elements and adapted to communicate through the channels in said base elements, a plurality of distributor carrier plates arranged with similar sides facing a common direction, frame means supporting said distributor carrier plates, each of said distributor carrier plates supporting one of said vertical columns at one side thereof, each of said distributor carrier plates at a side thereof opposite to the side supporting said vertical column being adapted to be connected to a plurality of output hoses, a plurality of channels formed in each of said distributor carrier plates communicating with the respective channels of the adjoining base plate and transmitting operating fluid to said output hoses.

2. The combination as claimed in claim 1, further comprising intermediate members disposed between two adjacent distributor carrier plates, second frame means engaging said base elements including a hold-down member for applying a variable downward pressure force on said column of said base elements to force said base elements into fluid-tight engagement with each other and with said distributor carrier plate.

3. The combination as claimed in claim 3, wherein said intermediate members include fastening means into which end positions of said second frame means slidably engage.

4. The combination as claimed in claim 3, wherein each of said distributor carrier plates comprises a plurality of channels transverse to the channels communicating said adjoining base plate with said output hoses, said intermediate member including channels passing therethrough for communication with respective ones of said transverse channels of the respective adjoining distributor carrier plate, said transverse channels of said distributor carrier plates being separated from the first-mentioned channels thereof by partitions removable for interconnecting any one of the first-mentioned channels with any one of the transverse channels.

5. The combination as claimed in claim 4, wherein said transverse channels are disposed in planes transverse to the planes of the first-mentioned channels of said distributor carrier plates.

6. The combination as claimed in claim 5, wherein said distributor plates and said intermediate members include a longitudinally extending auxiliary channel for conveying a bias pressure to said operational elements, end blocks disposed at each end of said plurality of distributor carrier plates, said end blocks containing respectively inlet and outlet means for said auxiliary channel.

7. The combination as claimed in claim 1, further including spacing members disposed at the respective ends of said plurality of distributor carrier plates, said spacing members including hold-down screws for forcing said plurality of the distributor carrier plates in fluid-tight engagement with each other.

References Cited

UNITED STATES PATENTS

| | | | |
|---|---|---|---|
| 3,158,164 | 11/1964 | Barton | 137—608 X |
| 3,195,572 | 7/1965 | Calls | 137—608 |
| 3,384,115 | 5/1968 | Drazan et al. | 137—81.5 X |

M. CARY NELSON, Primary Examiner

W. R. CLINE, Assistant Examiner

U.S. Cl. X.R.

137—608, 81.5

PO-1050
(5/69)

UNITED STATES PATENT OFFICE
CERTIFICATE OF CORRECTION

Patent No. 3,516,436 Dated June 23, 1970

Inventor(s) KLAUS ET AL

It is certified that error appears in the above-identified patent and that said Letters Patent are hereby corrected as shown below:

Claim 3, line 1, change "3" (second occurence) to -- 2 --.

SIGNED AND SEALED
OCT 6 - 1970

(SEAL)
Attest:

Edward M. Fletcher, Jr.
Attesting Officer

WILLIAM E. SCHUYLER, JR.
Commissioner of Patents